(No Model.)
D. W. PLOWMAN.
LISTED CORN CULTIVATOR.
No. 443,148. Patented Dec. 23, 1890.
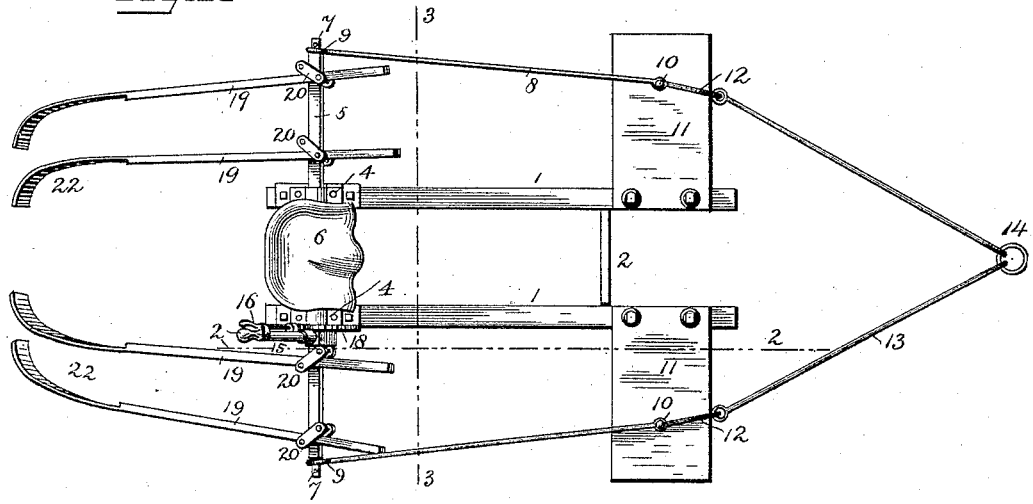
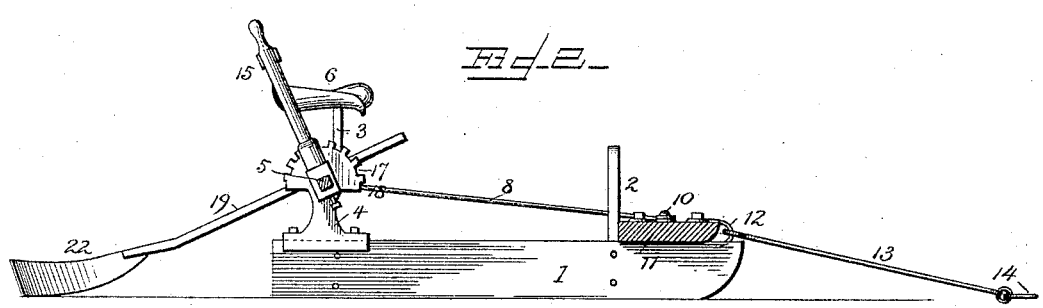
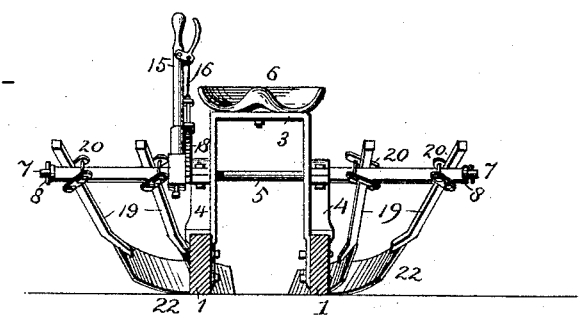
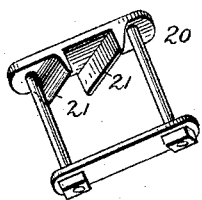
Witnesses
Chas. H. Durand,
Wm. Bagger
Inventor
David W. Plowman,
By his Attorneys,
C. A. Snow & Co.

UNITED STATES PATENT OFFICE.

DAVID W. PLOWMAN, OF BLUE SPRINGS, NEBRASKA.

LISTED-CORN CULTIVATOR.

SPECIFICATION forming part of Letters Patent No. 443,148, dated December 23, 1890.

Application filed June 12, 1890. Serial No. 355,236. (No model.)

*To all whom it may concern:*

Be it known that I, DAVID W. PLOWMAN, a citizen of the United States, residing at Blue Springs, in the county of Gage and State of Nebraska, have invented a new and useful Listed-Corn Cultivator, of which the following is a specification.

This invention relates to cultivators for cultivating listed corn; and it has for its object to construct a machine of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings, Figure 1 is a plan view of a cultivator embodying my improvements. Fig. 2 is a longitudinal sectional view taken on the line 2 2 in Fig. 1. Fig. 3 is a transverse sectional view taken on the line 3 3 in Fig. 1. Fig. 4 is a detail view of one of the clips, by means of which the shanks of the plows are secured to the rock-shaft.

Like numerals of reference indicate like parts in all the figures.

1 1 designate a pair of runners, which are connected by the arches 2 and 3 near their front and their rear ends, respectively. The runners 1 1 are provided at their rear ends with boxes 4 4, in which is journaled a rock-shaft 5. The rear arch 3 supports the driver's seat 6. The ends of the rock-shaft which extend beyond the boxes are squared in cross-section, and are provided at their extreme ends with spindles 7. Rods 8, having loops or eyes 9 at their rear ends, are journaled upon the said spindles, and the front ends of said rods are connected by means of vertical bolts 10 with brackets 11, extending laterally from the runners near the front ends of the latter. Upon the bolts 10 are mounted the clevises 12, to which are attached the draft-rods 13, the front ends of which may be connected by a ring or link 14.

15 designates a lever, which is secured upon the rock-shaft 5 adjacent to the driver's seat. Said lever is provided with a spring-actuated catch 16, adapted to engage any one of a series of notches 17 in a segment-plate 18, mounted upon or formed integrally with the adjacent box 4. The rock-shaft may thus be retained securely in any position to which it may be adjusted.

A series of shanks 19 are mounted upon the square portions of the rock-shaft 5 by means of clips 20, the upper or holding plates of which are provided with downwardly-extending lugs or studs 21, adapted to fit on each side of the shanks 19, which are thus held from lateral displacement. The outer or rear ends of the shanks 19 carry the curved blades or plows 22, which serve to throw the dirt inwardly toward the ridge of growing plants.

The operation of my invention and its advantages will be readily understood from the foregoing description, taken in connection with the drawings hereto annexed. The rock-shaft 5 may be readily adjusted by means of the hand-lever 15 so as to cause the blades or shovels to run in the ground to any desired depth or to be raised from the ground when it is desired to transport the machine from place to place. The depth to which the blades or shovels shall be permitted to work in the ground may also be regulated by adjusting the shanks 19 in the clips 20, by means of which they are secured upon the rock-shaft. When this is done, the shanks and blades may be adjusted to an approximately vertical position or at any desired angle with relation to the surface of the ground.

The construction of the device is simple and inexpensive, and it will be found very efficient in operation, especially for the purpose of cultivating crops of listed corn.

Having thus described my invention, I claim—

1. In a cultivator, the combination of the runners having the laterally-extending brackets near their front ends, the arches connecting the said runners, the boxes mounted upon the said runners at their rear ends, the rock-shaft journaled in said boxes and carrying the plows, the rods journaled upon spindles at the ends of said rock-shaft, the bolts connecting the front ends of said rods, with the bracket extending from the front ends of the runners, and the clevises mounted upon said bolts, substantially as set forth.

2. In a corn-cultivator, the combination of the runners connected by arches, the rock-shaft journaled in bearings at the rear ends of said runners, the clips, the clip-plates having downwardly-extending lugs or studs, and the shanks secured adjustably by means of said clips and clip-plates to the ends of the rock-shaft, which are squared, said shanks being provided at their outer or rear ends with the blades or shovels, substantially as and for the purpose set forth.

3. A corn-cultivator comprising the runners connected by arches, the laterally-extending brackets, the rock-shaft journaled in bearings at the rear ends of the runners and having squared portions terminating in spindles at their outer ends, the rods having eyes journaled upon said spindles, the bolts connecting the front ends of said rods with the brackets extending laterally from the runners, the clevises mounted upon said bolts, the draft-rods attached to said clevises, the shanks secured adjustably by means of clips to the squared portions of the rock-shaft, the plows or blades at the rear ends of said shank, and the hand-lever for adjusting the rock-shaft, all arranged and operating substantially as and for the purpose set forth.

In testimony that I claim the foregoing as my own I have hereto affixed my signature in presence of two witnesses.

DAVID W. PLOWMAN.

Witnesses:
T. J. RILE,
WM. H. COX.